United States Patent
Ahmed

(10) Patent No.: US 11,795,069 B2
(45) Date of Patent: Oct. 24, 2023

(54) OIL-WATER SEPARATION TECHNOLOGY USING PHASE SEPARATION REACTOR

(71) Applicant: Saudi Arabian Oil Company, Dhahran (SA)

(72) Inventor: Zeyad Tareq Ahmed, Chassell, MI (US)

(73) Assignee: Saudi Arabian Oil Company, Dhahran (SA)

( * ) Notice: Subject to any disclaimer, the term of this patent is extended or adjusted under 35 U.S.C. 154(b) by 66 days.

(21) Appl. No.: 16/824,236

(22) Filed: Mar. 19, 2020

(65) Prior Publication Data
US 2020/0299153 A1 Sep. 24, 2020

Related U.S. Application Data

(60) Provisional application No. 62/821,811, filed on Mar. 21, 2019.

(51) Int. Cl.
*C02F 1/40* (2023.01)
*B01D 69/02* (2006.01)
*B01D 69/06* (2006.01)

(52) U.S. Cl.
CPC .............. *C02F 1/40* (2013.01); *B01D 69/02* (2013.01); *B01D 69/06* (2013.01)

(58) Field of Classification Search
CPC .... B01D 2239/0421; B01D 2239/0428; B01D 36/00; B01D 17/00; B01D 17/02; B01D 17/12; B01D 2239/0471; B01D 2239/0478
See application file for complete search history.

(56) References Cited

U.S. PATENT DOCUMENTS 7,413,669 B2    8/2008  Gonzalez et al.
9,708,199 B2 *  7/2017  Zhang ..................... C02F 1/40
(Continued)

FOREIGN PATENT DOCUMENTS

WO    WO 2015143262    9/2015

OTHER PUBLICATIONS

Ong et al., "Polydopamine as a Versatile Adhesive Layer for Robust Fabrication of Smart Surface with Switchable Wettability for Effective Oil/Water Separation," Ind. Eng. Chem. Res., 58, 12, 4838-4843, 2019, 6 pages.

(Continued)

*Primary Examiner* — Ryan B Huang
(74) *Attorney, Agent, or Firm* — Fish & Richardson P.C.

(57) ABSTRACT

A phase separator apparatus includes a fluid flow pathway and a phase separator. The fluid flow pathway includes a fluid inlet and a fluid outlet. The fluid flow pathway is configured to flow multiphase fluid including an oil phase and a water phase from the fluid inlet to the fluid outlet. The phase separator is spatially positioned relative to the fluid flow pathway to receive the multiphase fluid flowing from the fluid outlet. The phase separator includes a mounting substrate and a separation layer attached to the mounting substrate. The separation layer includes a material switchable between oleophilic and hydrophobic under a first condition and oleophobic and hydrophilic under a second condition. The separation layer is configured to separate the oil phase and the water phase when the separation layer is under either the first condition or the second condition.

5 Claims, 4 Drawing Sheets

(56) References Cited

U.S. PATENT DOCUMENTS

| | | |
|---|---|---|
| 10,220,351 B2 | 3/2019 | Tuteja et al. |
| 2013/0264287 A1 | 10/2013 | Zhang et al. |
| 2015/0075989 A1* | 3/2015 | Solomon ............... C02F 1/4696 |
| | | 210/641 |
| 2019/0022565 A1 | 1/2019 | Dabirian et al. |

OTHER PUBLICATIONS

Ong et al., "Tannin-inspired robust fabrication of superwettability membranes for highly efficient separation of oil-in-water emulsions and immiscible oil/water mixtures," Separation and Purification Technology, vol. 227, Nov. 15, 2019, 8 pages.
Zhang et al., "A self-cleaning underwater superoleophobic mesh for oil-water separation," Scientific Reports, 3: 2326, 2013, 5 pages.
Zhang et al., "Smart surfaces with switchable superoleophilicity and superoleophobicity in aqueous media: toward controllable oil/water separation," NPG Asia Materials, vol. 4, e8, 2012, 8 pages.
U.S. Appl. No. 62/865,477, filed Jun. 24, 2019, Ahmed et al.
U.S. Appl. No. 62/900,905, filed Sep. 16, 2019, Ahmed et al.
GCC Examination Report in Gulf Cooperation Council Appln. No. GC 2020-39410, dated Jul. 29, 2021, 6 pages.
PCT International Search Report and Written Opinion issued in International Application No. PCT/US2020/023589 dated Sep. 14, 2020, 18 pages.
PCT Invitation to Pay Additional Fees and, Where Applicable, Protest Fee issued in International Application No. PCT/US2020/023589 on Jul. 21, 2020, 14 pages.

\* cited by examiner

OIL-WATER SEPARATION TECHNOLOGY USING PHASE SEPARATION REACTOR

CLAIM OF PRIORITY

This application claims priority to U.S. Provisional Application Ser. No. 62/821,811, filed on Mar. 21, 2019, the entire contents of which is hereby incorporated by reference.

TECHNICAL FIELD

This disclosure relates to separating multiphase fluids, for example, fluids including an oil phase and a water phase, in fluids processing plants, for example, plants that include phase separation reactors.

BACKGROUND

Hydrocarbons trapped in subsurface reservoirs in subterranean zones often exist as multiphase fluids, for example, an oil phase and a water phase. Phase separation of such fluids is often necessary as part of multiple operations including, for example, hydrocarbon exploration, refining, distribution, utilization, oily wastewater treatment, spill and accident control.

SUMMARY

This disclosure describes oil-water separation technology using phase separation reactor.

Certain aspects of the subject matter described in this disclosure can be implemented as an apparatus. The apparatus includes a fluid flow pathway and a phase separator. The fluid flow pathway includes a fluid inlet and a fluid outlet. The fluid flow pathway is configured to flow multiphase fluid including an oil phase and a water phase from the fluid inlet to the fluid outlet. The phase separator is spatially positioned relative to the fluid flow pathway to receive the multiphase fluid flowing from the fluid outlet. The phase separator includes a mounting substrate and a separation layer attached to the mounting substrate. The separation layer includes a material switchable between oleophilic and hydrophobic under a first condition and oleophobic and hydrophilic under a second condition. The separation layer is configured to separate the oil phase and the water phase when the separation layer is under either the first condition or the second condition.

An aspect combinable with any of the other aspects can include the following features. The separation layer is covalently bonded to the mounting substrate.

An aspect combinable with any of the other aspects can include the following features. The separation layer is configured to permit flow of the oil phase through the separation layer and prevent flow of the water phase through the separation layer under the first condition.

An aspect combinable with any of the other aspects can include the following features. The separation layer is configured to permit flow of the water phase through the separation layer and prevent flow of the oil phase through the separation layer under the second condition.

An aspect combinable with any of the other aspects can include the following features. The mounting substrate includes multiple openings to permit flow of the oil phase or the water phase flowed through the separation layer.

Certain aspects of the subject matter described here can be implemented as a phase separation reactor that includes a reactor body and a separation layer positioned within the reactor body. The reactor body defines a multiphase fluid receiving portion configured to receive a multiphase fluid including an oil phase and a water phase. The reactor body defines a separated phase receiving portion configured to receive a separated phase of the multiphase fluid. The separation layer is positioned within the reactor body. The separation layer includes a material switchable between oleophilic and hydrophobic under a first condition and oleophobic and hydrophilic under a second condition. The separation layer is configured to separate the oil phase and the water phase when the separation layer is under either the first condition or the second condition to flow one separated phase through the separation layer and to prevent flow of the other separated phase through the separation layer.

An aspect combinable with any of the other aspects can include the following features. A mounting substrate is positioned within the reactor body. The separation layer is attached to the mounting substrate.

An aspect combinable with any of the other aspects can include the following features. The separation layer is covalently bonded to the mounting substrate.

An aspect combinable with any of the other aspects can include the following features. A first phase outlet is coupled to the separated phase receiving portion. The first phase outlet is configured to flow the separated phase flowed through the separation layer out of the reactor body.

An aspect combinable with any of the other aspects can include the following features. A second phase outlet is coupled to the multiphase fluid receiving portion. The second phase outlet is configured to flow the separated phase prevented from flowing through the separation layer out of the reactor body.

An aspect combinable with any of the other aspects can include the following features. A baffle is configured to control flow of fluid through the multiphase fluid receiving portion.

An aspect combinable with any of the other aspects can include the following features. A fluid flow pathway includes a fluid outlet. The fluid flow pathway is fluidically coupled to the reactor body to flow the multiphase fluid into the reactor body.

An aspect combinable with any of the other aspects can include the following features. The multiphase fluid receiving portion is substantially cylindrical.

An aspect combinable with any of the other aspects can include the following features. The separated phase receiving portion is substantially conical.

An aspect combinable with any of the other aspects can include the following features. The reactor is a single stage reactor.

An aspect combinable with any of the other aspects can include the following features. The reactor includes a separation layer treatment unit attached to the reactor body. The separation layer treatment unit carries one or more chemicals configured to switch the material of the separation layer between the first condition and the second condition.

Certain aspects of the subject matter described here can be implemented as a phase separation reactor assembly including at least two phase separation reactors fluidically coupled in series.

Certain aspects of the subject matter described here can be implemented as a method. A separation layer such as the one described earlier is attached to a mounted substrate. The mounted substrate is positioned inside a phase separation reactor. A multiphase fluid including an oil phase and a water phase is flowed through the phase separation reactor and over the separation layer. The oil phase and the water phase are separated from each other.

The details of one or more implementations of the disclosure are set forth in the accompanying drawings and the description that follows. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

This disclosure describes oil-water separation technology that works based on material surface property rather than gravity or coalescence. In some implementations, a continuous or batch flow reactor is equipped with a filter or mesh coated with super-olephilic or super-olephobic switchable surface material. A multiphase fluid stream that includes an oil phase and a water phase, for example, a stream of hydrocarbons produced from a subsurface reservoir in a subterranean zone, is processed by the reactor as described later. Depending on the material used, oil can be separated from water to purify water or water can be separated from oil to improve oil quality. The reactor function is pH dependent. In some implementations, the reactor can be operated in single or dual stage depending on specific conditions of the multiphase stream. Oil-water separation can be caused using one or more of several types of super-olephilic or super-olephobic switchable surface materials that can be coated or otherwise loaded at the surface of a supporting medium. In all applications, the separation material/medium can be regenerated by switching the surface properties through pH change, this is unique to this technology.

The subject matter described here can be implemented to achieve one or more advantages. For example, the phase separation reactor described here can be implemented to separate oily wastewaters resulting from hydrocarbon production or other operations. The quantity of water in oil or oil in water can be reduced. By switching the separation conditions of the separation layer, the same reactor can be used to collect separated oil or separated water. Evaporation ponds can be cleaned from oil. The separation technology can be scaled to any desired level allowing the reactor to be implemented on a large, industrial scale such as a gas separation reactor plant and all components are built to that scale. This separation technology will also be used for the treatment of oily wastewater to remove wide range of oils and oil products, depending on the design, the reactor can be used as a primary oil water separator to replace gravity separators, such as American Petroleum Institute design separators and corrugated plate interceptors, commonly used in oil and gas industries. It can also be designed to work as secondary oil water separators to replace Walnut Shell filters or packed bed filters.

Figure 1:
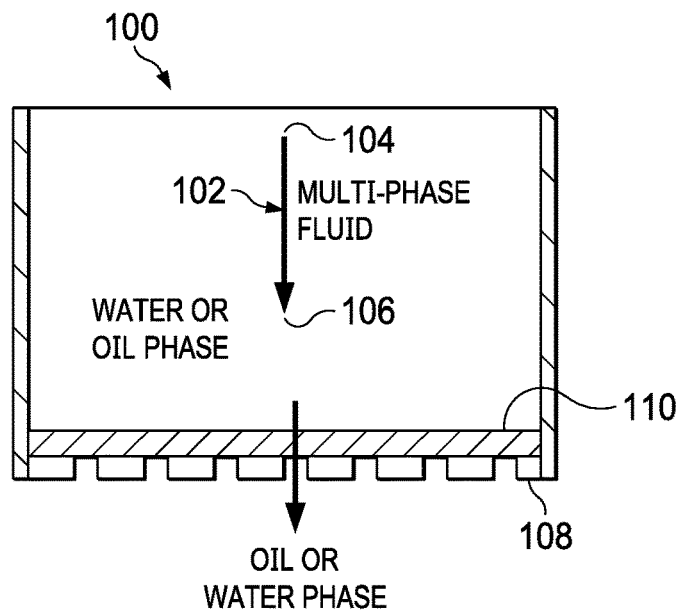
FIG. 1 is a schematic of an example of an apparatus including a multiphase fluid separation layer attached to a mounting substrate.

FIG. 1 is a schematic of an example of an apparatus 100 including a multiphase fluid separation layer 110 attached to a mounting substrate 108. For example, the mounting substrate 108 is a plate or similar member that may or may not be flat and that has a fit-for-purpose shape and dimension. The apparatus 100 includes a fluid flow pathway 102 including a fluid inlet 104 and a fluid outlet 106. In some implementations, the fluid flow pathway 102 can be an elongate tube or a flowline through which multiphase fluid is flowed. The fluid flow pathway 102 flows the multiphase fluid, which includes an oil phase and a water phase, from the fluid inlet 104 to the fluid outlet 104.

A phase separator is spatially positioned relative to the fluid flow pathway 102 to receive the multiphase fluid flowing from the fluid outlet 106. For example, the phase separator can be positioned within a container into which the fluid flow pathway 102 discharges the multiphase fluid. The phase separator includes the mounting substrate 108 and the separation layer 110 attached to the mounting substrate 108. In some implementations, the separation layer 110 is covalently bonded to the mounting substrate 108. The mounting substrate could be made of metal or any other corrosion resistant material that can provide support to the separation layer 110 and withstand the flow conditions without deformation. The mounting substrate 108 and the separation layer can take any shape or angle necessary to support the specific purpose of the reactor. The separation material 110 can be made in various forms including coating of metal mesh, coating of sponge, or coating of loose substrate for use in packed beds, in all cases the mounting substrate will provide physical support to the separation material.

The separation layer 110 includes a material switchable between oleophilic (that is, having an affinity to oil) and hydrophobic (that is, having an aversion to water) under a first condition, and oleophobic (that is, having an aversion to oil) and hydrophilic (that is, having an affinity to water) under a second condition. In some implementations, the material in the separation layer is poly(2-vinyl pyridine) and oleophilic/hydrophobic polydimethylsiloxane. When the multiphase fluid is flowed over the separation layer 110 and the material of the separation layer 110 is under the first condition, the separation layer 110 permits the water phase to pass through the separation layer 110 and prevents the oil phase from passing through the separation layer 110. Conversely, when the multiphase fluid is flowed over the separation layer 110 and the material of the separation layer 110 is under the second condition, the separation layer 110 permits the oil phase to pass through the separation layer 110 and prevents the water phase from passing through the separation layer 110. The mounting substrate 108 includes multiple openings through which the phase flowed through the separation layer 110 flows. In this manner, the phase separator separates the oil phase and the water phase under either the first condition or the second condition. That is, under either condition, phase separation is implemented. The specific condition determines the phase that is flowed through the separation layer 110 and the phase that is prevented from flowing through the separation layer 110.

Figure 2:
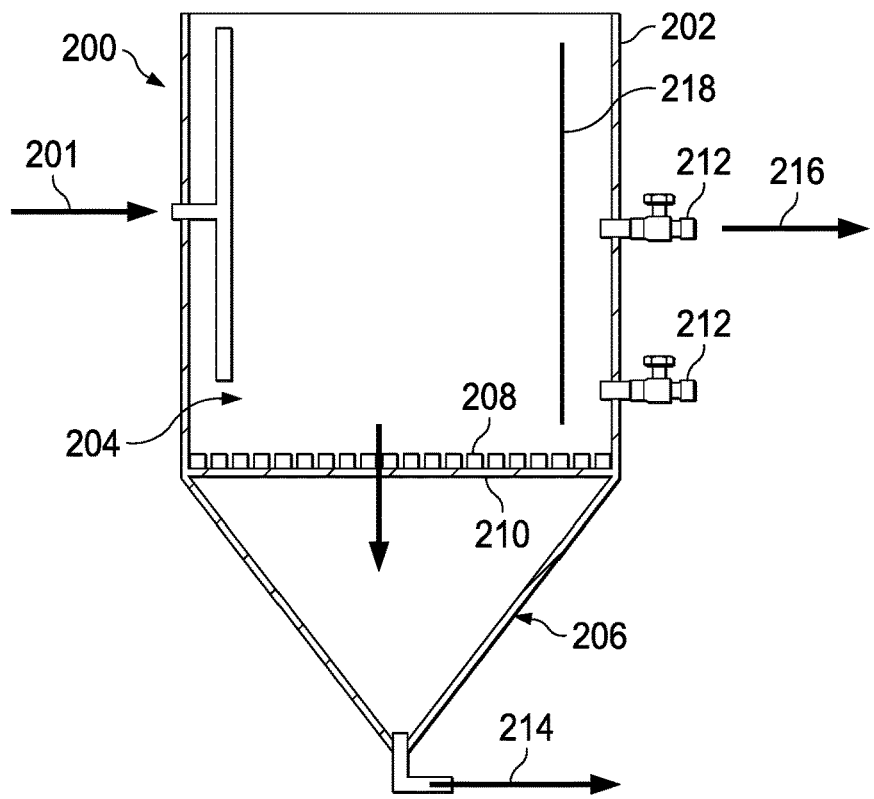
FIG. 2 is a schematic of an example of a single stage reactor to separate multiphase fluids.

FIG. 2 is a schematic of an example of a single stage reactor 200 to separate multiphase fluids. In some implementations, the reactor 200 can be implemented as an industrial-scale reactor having dimensions and other features common to industrial-scale reactors. The reactor 200 includes a reactor body 202 that defines a multiphase fluid receiving portion 204 and a separated phase receiving portion 206. In some implementations, the reactor body 202 includes a drum having a cross-section and an elongated portion of dimensions sufficient to receive the multiphase fluid and to house the components described here. For example, the portion 204 can be a substantially cylindrical portion with a substantially circular cross-section. For example, the portion 206 can have a substantially conical or truncated conical cross-section. The use of the term "substantially" as a prefix to a shape (for example, circular or conical) indicates a permissible variation from that shape by a quantity that depends, for example, on machining tolerances of machinery used to form the shape. The diameter of a bottom end of the portion 204 can be substantially equal to the larger diameter of a top end of the portion 206. In construction, the bottom end of the portion 204 and the top end of the portion 206 can be fluidically sealed. By "substantially equal," it is meant that the diameters of the bottom end of the portion 204 and the top end of the portion 206 can differ from each other by a quantity that allows forming a fluidic seal between the two portions when connected.

In some implementations, the reactor 200 includes a separation layer 208 that is substantially identical to the separation layer 110 (FIG. 1) and a mounting substrate 210 that is substantially identical to the mounting substrate 108 (FIG. 1). The separation layer 208 is attached to, for example, covalently bonded to, the mounting substrate 108. In the example schematic, the separation layer 208 rests on top of the mounting substrate 210. That is, the mounting substrate 210 serves as a support for the separation layer 208. In some implementations, other forms of supporting structures (for example, a composite wire mesh or another mounting substrate) can be positioned within the separation layer 210. In such implementations, the separation layer can surround the mounting substrate. The combination of the separation layer 208 and the mounting substrate 210 can have a cross-sectional shape that is the same as the cross-sectional shape of the bottom end of the portion 204 and the top end of the portion 206. In addition, the combination can have a diameter that allows the combination to be positioned at the intersection of the bottom end of the portion 204 and the top end of the portion 206 and to prevent the multiphase fluid from flowing past edges of the combination. In some implementations, a fluidic seal can be disposed around the edges of the combination to prevent the multiphase from flowing from the portion 204 to the portion 206 without passing through the separation layer 208.

The portion 206 includes (or defines) a first phase outlet 214 through which the separated phase flowed through the separation layer 208 and the mounting substrate 210 is flowed out of the reactor body 202. Similarly, the portion 204 includes (or defines) a second phase outlet 216 through which the separated phase prevented from flowing through the separation layer 208 and the mounting substrate 210 is flowed out of the reactor body 202. In some implementations, the reactor 200 includes a baffle 218. In some applications, the baffle 218 can hold lighter fluids floating in the portion 204 and prevent them from reaching the outlets controlled by valves 212, 216, which can be controlled externally by the level of the fluid overflow.

In operation, the portion 204 can receive a multiphase fluid that includes an oil phase and a water phase. Depending on whether the separation layer 208 is oleophilic and hydrophobic (that is, the first condition) or oleophobic and hydrophilic (that is, the second condition), the separation layer 208 can permit either the water phase or the oil phase to pass through the separation layer 208 and prevent the oil phase or the water phase from passing through the separation layer 208. The portion 206 can receive the separated phase flowed through the separation layer 208 from the portion 204. One separated phase can be flowed out of the reactor 200 through the first phase outlet 214 and the other separated phase can be flowed out of the reactor 200 through the second phase outlet 216. In some implementations, the separated phase that is prevented from flowing through the separation layer 208 can be recirculated into the portion 204 to be once again processed by the separation layer 208. In this manner, the effectiveness of separation of the multiphase fluid can be improved.

Figure 3:
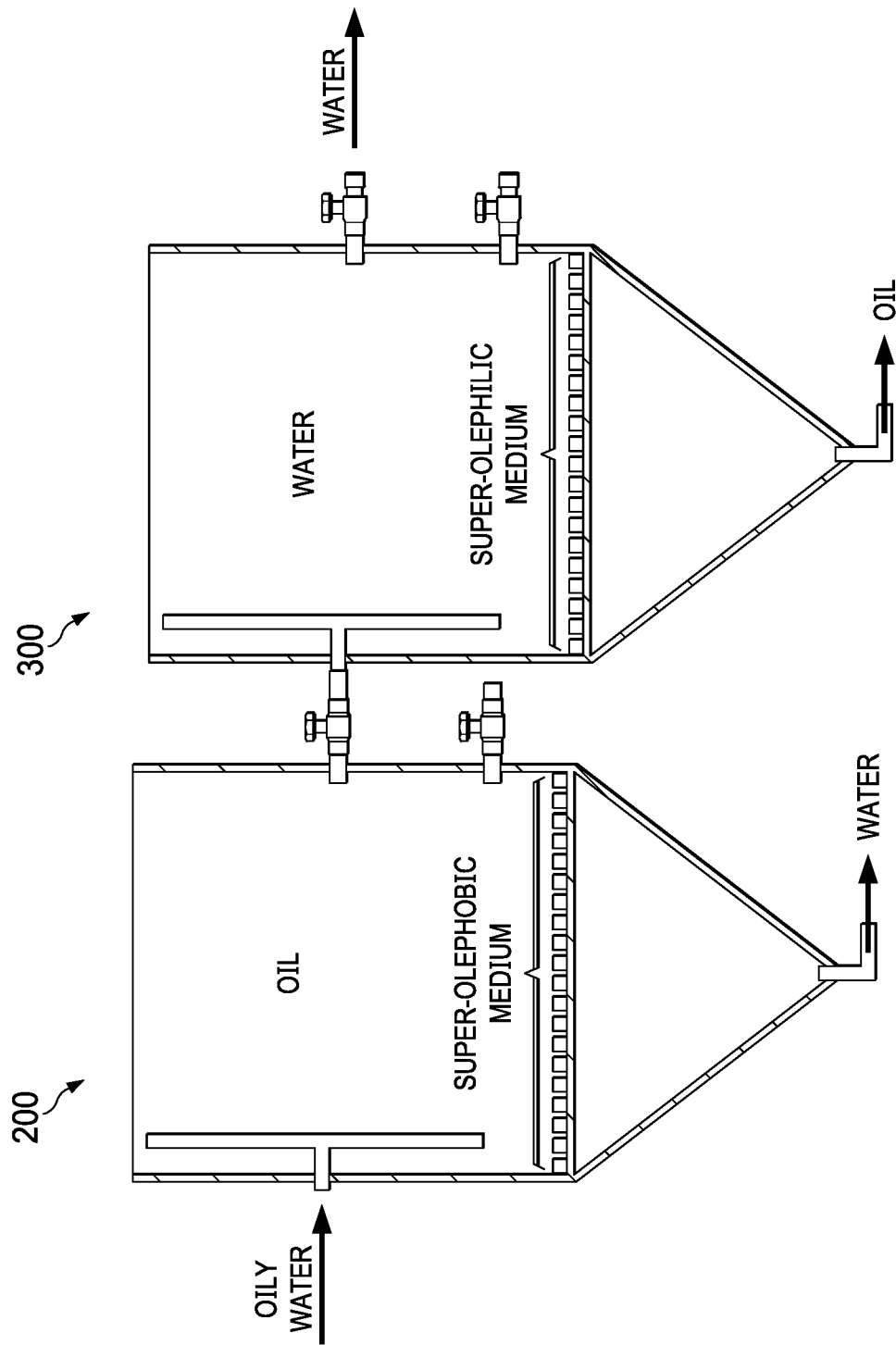
FIG. 3 is a schematic of an example of a dual stage reactor to separate multiphase fluids.

FIG. 3 is a schematic of an example of a dual stage reactor to separate multiphase fluids. The reactor 200 is an example of a single stage reactor. A dual stage reactor is a combination of the reactor 200 and another reactor 300 that has substantially the same components as the reactor 200. A difference between the reactor 200 and the reactor 300 is that the separation layer of one, for example, the reactor 200, is oleophobic and hydrophilic (that is, the second condition) while the separation layer of the other, for example, the reactor 300, is oleophylic and hydrophobic (that is, the first condition). Consequently, in this example, the separation layer of the reactor 200 permits flow of water and prevents the flow of oil. Conversely, the separation layer of the reactor 300 permits flow of oil and prevents the flow of water.

In some implementations, the reactor 200 and the reactor 300 can be fluidically coupled, for example, using one or more tubular members or pipes. In such implementations, the separated phase prevented from flowing the separation layer of the reactor 200 is flowed into the reactor 300 through the fluidic coupling. The separated phase may include some remnants of the other phase. Such remnants are further separated by the separation layer of the reactor 300.

Figure 4:
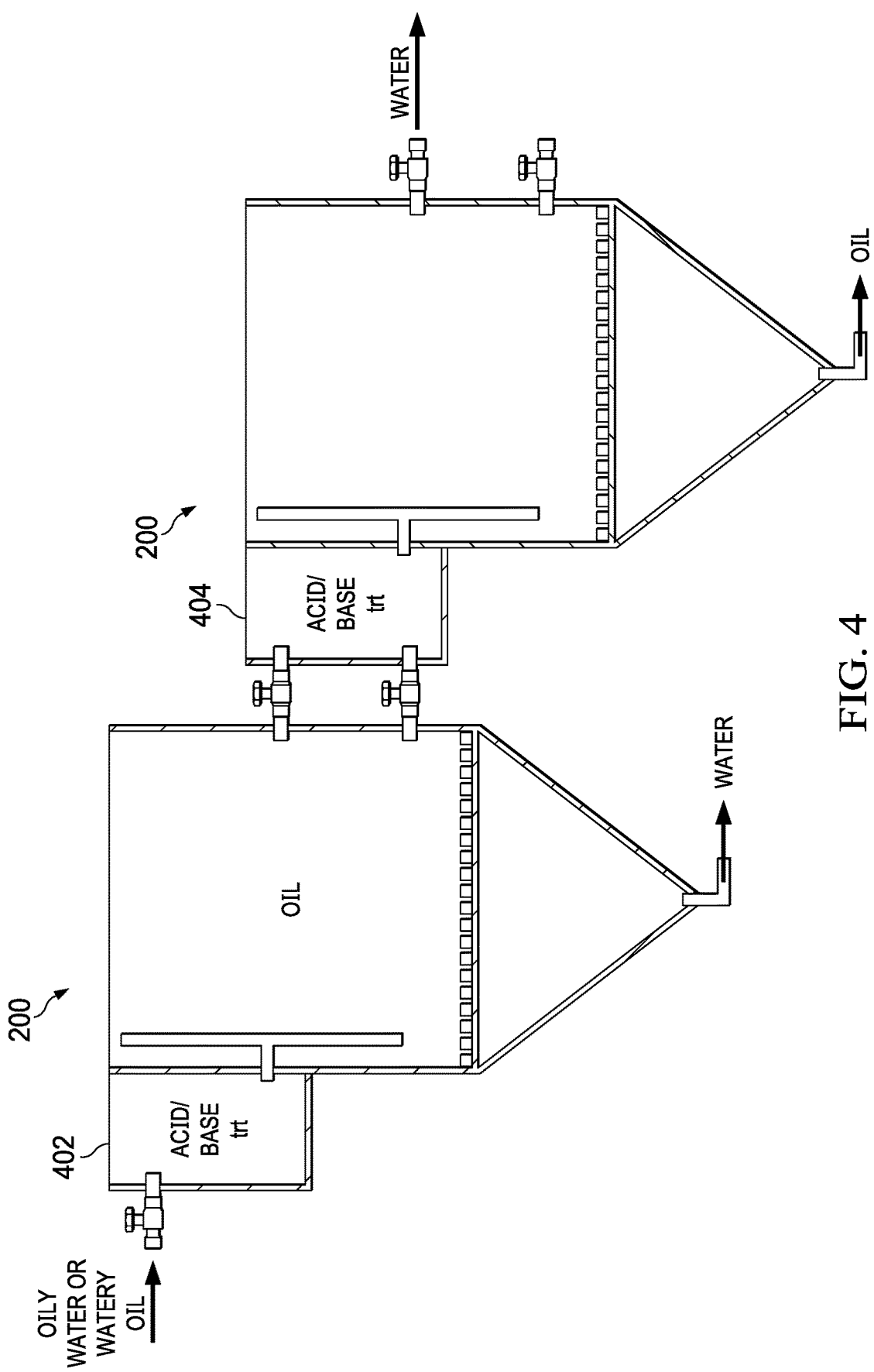
FIG. 4 is a schematic of an example of a dual stage reactor with acid/base treatment features.

FIG. 4 is a schematic of an example of a dual stage reactor with acid/base treatment features. In some implementations, the dual stage reactor is similar to the dual stage reactor of FIG. 3 and includes the reactor 200 and the reactor 300. In some implementations, the dual stage reactor has two single stage reactors, for example, two of the reactor 200 or two of the reactor 300. The dual stage reactor can be fluidically coupled as described earlier with reference to FIG. 4.

In some implementations, a separation layer treatment unit can be attached to each reactor of the dual stage reactor, for example, treatment unit 402 attached to the reactor 200 or the treatment unit 404 attached to the reactor 200. The treatment unit can include a housing, one or more containers storing components, and flow mechanisms including pumps, valves, pipes and the like. The treatment unit can be operated to switch the separation layer between the first condition and the second condition depending on the phase to be flowed through the separation layer and the phase to be prevented from flowing through the separation layer. The components in the treatment unit to switch the separation layer can include solvents or chemicals, for example, acids and bases that can switch the separation layer between the two conditions by modifying the pH of the separation layer. Since the surface function of the separation material 208 change with pH, the acid/base 402 compartment is used to adjust pH to the optimum pH for the intended phase separation at the first compartment. All fluid (phase 1) passed through the separation material 208 will be collected/flow through the outlet 214, the mix retained in 204 (two phases) then will flow to 404 for another pH adjustment to the optimum pH for the second fluid phase (phase 2) to pass through the outlet. The remaining mix of phases can be returned to the inlet of 200 for further processing in another cycle.

Figure 5:
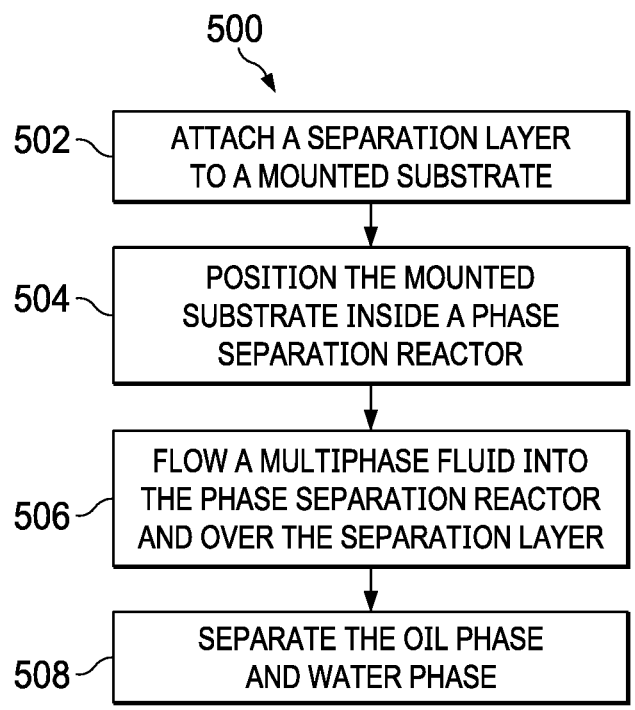
FIG. 5 is a flowchart of an example of a method of making and using a reactor.

FIG. 5 is a flowchart of an example of a method 500 of making and using a reactor. The reactor can be the reactor 200 described earlier with reference to FIG. 1. At 502, a separation layer, for example, the separation layer 110, is attached to a mounted substrate, for example, the mounted substrate 108. At 504, the mounted substrate is positioned inside a phase separation reactor, for example, between the portion 204 and the portion 206 of the reactor 200. At 506, a multiphase fluid is flowed into the phase separation reactor and over the separation layer 506. At 508, the oil phase is separated from the water phase. Some aspects of this disclosure can be implemented to make the reactor 200 without necessarily using the reactor. Some aspects of this disclosure can be implemented to use the reactor 200 without necessarily making the reactor A number of implementations of the disclosure have been described.

In some implementations, the oil-water separation techniques described here can be combined with other oil-water separation techniques, for example, gravity-based or coalescence-based techniques.

In some implementations, the reactor described in this disclosure can be stationary such that the multiphase fluid is brought to the reactor. In some implementations, the reactor described in this disclosure can be mobile such that the reactor can be transported to the multiphase fluid and implemented on-site.

Nevertheless, it will be understood that various modifications may be made without departing from the spirit and scope of the disclosure.

What is claimed is:

1. A phase separation reactor system comprising:
a first phase separation reactor and a second phase separation reactor, each of the first phase separation reactor and the second phase separation reactor comprising:
a drum defining a fluid flow pathway comprising a fluid inlet and a fluid outlet, the fluid flow pathway configured to flow a multiphase fluid mix comprising an oil phase and a water phase from the fluid inlet to the fluid outlet; and
a phase separator spatially positioned relative to the fluid flow pathway to receive the multiphase fluid mix flowing through the drum, the phase separator comprising:
a mounting substrate; and
a separation layer attached to the mounting substrate, the separation layer comprising a material switchable between oleophilic and hydrophobic under a first condition and oleophobic and hydrophilic under a second condition, the separation layer configured to separate the oil phase and the water phase when the separation layer is under either the first condition or the second condition, wherein the material of the separation layer switches between the first condition and the second condition in response to modification of the pH of the separation layer by the multiphase fluid mix;

an acid-base container within a housing, the acid-base container attached to, and fluidically connected to, an outlet of the first phase separation reactor and an inlet of the second phase separation reactor, the acid-base container carrying one or more chemicals configured to switch the material between the first condition and the second condition;

and wherein the system is configured such that:

as the multiphase fluid mix flows through the first phase separation reactor, the separation layer of the first phase separation reactor is switched to the first condition;

the pH of the multiphase fluid mix flowing from the outlet of the first phase separation reactor to the acid-base container is modified by the chemical carried by the compartment of the acid-base container; and the multiphase fluid mix then flows from the acid-base container to the inlet of the second phase separation reactor and the separation layer of the second phase separation reactor is switched to the second condition.

2. The phase separation reactor system of claim 1, wherein the separation layer is covalently bonded to the mounting substrate.

3. The phase separation reactor system of claim 1, wherein the separation layer is configured to permit flow of the oil phase through the separation layer and prevent flow of the water phase through the separation layer under the first condition.

4. The phase separation reactor system of claim 1, wherein the separation layer is configured to permit flow of the water phase through the separation layer and prevent flow of the oil phase through the separation layer under the second condition.

5. The phase separation reactor system of claim 1, wherein the mounting substrate includes a plurality of openings to permit flow of the oil phase or the water phase flowed through the separation layer.

* * * * *